United States Patent
Karsenti et al.

(10) Patent No.: US 10,186,026 B2
(45) Date of Patent: Jan. 22, 2019

(54) SINGLE IMAGE DETECTION

(71) Applicant: KLA-Tencor Corporation, Milpitas, CA (US)

(72) Inventors: Laurent Karsenti, Rehovot (IL); Kris Bhaskar, San Jose, CA (US); John Raymond Jordan, III, Mountain View, CA (US); Sankar Venkataraman, Milpitas, CA (US); Yair Carmon, Stanford, CA (US)

(73) Assignee: KLA-Tencor Corp., Milpitas, CA (US)

( * ) Notice: Subject to any disclaimer, the term of this patent is extended or adjusted under 35 U.S.C. 154(b) by 237 days.

(21) Appl. No.: 15/353,210

(22) Filed: Nov. 16, 2016

(65) Prior Publication Data
US 2017/0140524 A1 May 18, 2017

Related U.S. Application Data

(60) Provisional application No. 62/256,601, filed on Nov. 17, 2015.

(51) Int. Cl.
*G06K 9/00* (2006.01)
*G06T 7/00* (2017.01)
(Continued)

(52) U.S. Cl.
CPC .......... *G06T 7/0004* (2013.01); *G06K 9/6256* (2013.01); *G06K 9/6269* (2013.01);
(Continued)

(58) Field of Classification Search
CPC . G06T 2207/10061; G06T 2207/20021; G06T 2207/20081; G06T 2207/20084;
(Continued)

(56) References Cited

U.S. PATENT DOCUMENTS 6,691,052 B1 * 2/2004 Maurer ..................... G03F 1/84
702/81
6,891,627 B1 5/2005 Levy et al.
(Continued)

FOREIGN PATENT DOCUMENTS

CN 104850858 8/2015
WO 2014/004682 1/2014

OTHER PUBLICATIONS

International Search Report for PCT/US2016/062490 dated Apr. 27, 2017.
(Continued)

*Primary Examiner* — Wesley J Tucker
(74) *Attorney, Agent, or Firm* — Ann Marie Mewherter

(57) ABSTRACT

Methods and systems for detecting defects on a specimen are provided. One system includes a generative model. The generative model includes a non-linear network configured for mapping blocks of pixels of an input feature map volume into labels. The labels are indicative of one or more defect-related characteristics of the blocks. The system inputs a single test image into the generative model, which determines features of blocks of pixels in the single test image and determines labels for the blocks based on the mapping. The system detects defects on the specimen based on the determined labels.

36 Claims, 4 Drawing Sheets

(51) Int. Cl.
*G06K 9/62* (2006.01)
*G06K 9/46* (2006.01)

(52) U.S. Cl.
CPC ......... *G06K 9/6287* (2013.01); *G06K 9/4642* (2013.01); *G06T 2207/10061* (2013.01); *G06T 2207/20021* (2013.01); *G06T 2207/20081* (2013.01); *G06T 2207/20084* (2013.01); *G06T 2207/30148* (2013.01)

(58) Field of Classification Search
CPC ........ G06T 2207/30148; G06T 7/0004; G06K 9/6256; G06K 9/6269; G06K 9/6287; G06K 9/4642
See application file for complete search history.

(56) References Cited

U.S. PATENT DOCUMENTS

| | | | |
|---|---|---|---|
| 6,902,855 B2 | 6/2005 | Peterson et al. | |
| 7,418,124 B2 | 8/2008 | Peterson et al. | |
| 7,570,796 B2 | 8/2009 | Zafar et al. | |
| 7,676,077 B2 | 3/2010 | Kulkarni et al. | |
| 7,769,225 B2 | 8/2010 | Kekare et al. | |
| 8,041,106 B2 | 10/2011 | Pak et al. | |
| 8,126,255 B2 | 2/2012 | Bhaskar et al. | |
| 8,213,704 B2 | 7/2012 | Peterson et al. | |
| 8,664,594 B1 | 4/2014 | Jiang et al. | |
| 8,692,204 B2 | 4/2014 | Kojima et al. | |
| 8,698,093 B1 | 4/2014 | Gubbens et al. | |
| 8,716,662 B1 | 5/2014 | MacDonald et al. | |
| 9,222,895 B2 | 12/2015 | Duffy et al. | |
| 2003/0158679 A1* | 8/2003 | Fukushima | G06T 7/0004 702/81 |
| 2003/0208731 A1 | 11/2003 | Miwa | |
| 2003/0228049 A1 | 12/2003 | Asai | |
| 2007/0211932 A1* | 9/2007 | Lee | G06T 7/0004 382/145 |
| 2010/0208979 A1 | 8/2010 | Abbott et al. | |
| 2013/0236083 A1* | 9/2013 | Wang | G06T 7/001 382/144 |
| 2014/0376801 A1* | 12/2014 | Karsenti | G06T 7/001 382/145 |
| 2017/0047195 A1* | 2/2017 | Lee | H01J 37/222 |
| 2017/0140516 A1* | 5/2017 | Maher | G06T 7/11 |
| 2017/0148226 A1 | 5/2017 | Zhang et al. | |
| 2017/0186144 A1* | 6/2017 | Chien | G06T 5/002 |
| 2017/0200264 A1* | 7/2017 | Park | G01N 21/9501 |

OTHER PUBLICATIONS

U.S. Appl. No. 15/176,139, filed Jun. 7, 2016 by Zhang et al. (submitted as U.S. Patent Application Publication No. 2017/0148226 published May 25, 2017 by Zhang et al.).

* cited by examiner

SINGLE IMAGE DETECTION

BACKGROUND OF THE INVENTION

1. Field of the Invention

The present invention generally relates to methods and systems for detecting defects on a specimen by single image detection.

2. Description of the Related Art

The following description and examples are not admitted to be prior art by virtue of their inclusion in this section.

Fabricating semiconductor devices such as logic and memory devices typically includes processing a substrate such as a semiconductor wafer using a large number of semiconductor fabrication processes to form various features and multiple levels of the semiconductor devices. For example, lithography is a semiconductor fabrication process that involves transferring a pattern from a reticle to a resist arranged on a semiconductor wafer. Additional examples of semiconductor fabrication processes include, but are not limited to, chemical-mechanical polishing (CMP), etch, deposition, and ion implantation. Multiple semiconductor devices may be fabricated in an arrangement on a single semiconductor wafer and then separated into individual semiconductor devices.

Inspection processes are used at various steps during a semiconductor manufacturing process to detect defects on wafers to promote higher yield in the manufacturing process and thus higher profits. Inspection has always been an important part of fabricating semiconductor devices such as ICs. However, as the dimensions of semiconductor devices decrease, inspection becomes even more important to the successful manufacture of acceptable semiconductor devices because smaller defects can cause the devices to fail.

There are several currently used methods for detecting defects on specimens such as wafers and reticles. For example, in die to die image comparison, a reference image and a target image are aligned and subtracted. A global threshold is then applied to the subtracted pixels. A binary map corresponding to defect candidates is created. In another embodiment, in cell to cell image comparisons, in the case of periodic structures (e.g., memory devices), the target, image is shifted by one period and compared to itself. More advanced methods can also be used to try to segment the image into different "homogenous" areas and to optimize the thresholding method to the specific segment statistic. This is the principle method behind some detection methods implemented on inspection tools commercially available from KLA-Tencor, Milpitas, Calif., such as segmented auto-thresholding (SAT), median die auto-thresholding (MDAT), HLAT, context-based inspection (CBI), and target based inspection (TBI).

A variation of the above-described methods may be used in some commercially available electron beam inspection tools in the context of scanning electron microscope (SEM) images. The thresholding mechanism is based on the two-dimensional histogram representation (scattergram). In this implementation, the outlier pixels are identified as being outside the principal cloud formed by the joint histograms of the reference and target images. In this case, the pixel value distribution of the target image associated with a given gray value of the reference image is used to estimate the optimized threshold.

There are, however, a number of disadvantages of the above described inspection methods. For example, the die-to-die method requires the acquisition of a minimum of two images (reference and test) which doubles the image acquisition time. Unambiguous detection requires a minimum of three dies to be imaged (two reference and one test). In addition, prior to comparison, test and reference images need to be aligned. Only the overlapped area can be analyzed. Reference images can also introduce some noise in the analysis which always penalizes the signal-to-noise ratio (SNR). A separate module can take care of the defect classification part, but generally leads to poor results due to defect localization issues. Furthermore, any comparison based method will be subject to normal differences between the test and reference patterns. An example of this is line edge roughness (LER). Typical comparison methods limit sensitivity due to nominal LER.

Furthermore, the currently used methods require an algorithm team to design features ("hand-crafted" features) to capture some pertinent information contained in any image. The team needs to address generic questions such as: What is a defect versus noise?; and What can distinguish between different defect classes? The generic assumptions are continuously challenged by read data. To improve the performance for a specific layer/defect type, the team needs to modify the algorithm and new software needs to be released.

Accordingly, it would be advantageous to develop systems and methods for detecting defects on a specimen that do not have one or more of the disadvantages described above.

SUMMARY OF THE INVENTION

The following description of various embodiments is not to be construed in any way as limiting the subject matter of the appended claims.

One embodiment relates to a system configured to detect defects on a specimen. The system includes an imaging subsystem configured for generating images of a specimen. The imaging subsystem includes at least an energy source configured to direct energy to the specimen and at least a detector configured to detect energy from the specimen. The system also includes one or more computer subsystems coupled to the imaging subsystem. The one or more computer subsystems are configured for acquiring a single test image for a portion of the specimen generated by the imaging subsystem. In addition, the system includes one or more components executed by the one or more computer subsystems. The one or more components include a generative model. The generative model includes a non-linear network configured for mapping blocks of pixels of an input feature map volume into labels. The labels are indicative of one or more defect-related characteristics of the blocks. The one or more computer subsystems are configured for inputting the single test image into the generative model. The generative model is configured for separating the single test image into multiple blocks of pixels. The generative model is also configured for, for at least one of the multiple blocks of pixels, determining a feature of the at least one of the multiple blocks based on only the pixels in the at least one of the multiple blocks. In addition, the generative model is configured for selecting one of the labels for the at least one of the multiple blocks based on the determined feature and the mapping of the blocks of the pixels of the input feature map volume into the labels. The one or more computer subsystems are also configured for detecting defects in the portion of the specimen based on the selected label for the at least one of the multiple blocks. The system may be further configured as described herein.

Another embodiment relates to a computer-implemented method for detecting defects on a specimen. The method includes separating a single test image generated for a portion of a specimen by an imaging subsystem into multiple blocks of pixels. For at least one of the multiple blocks of pixels, the method includes determining a feature of the at least one of the multiple blocks based on only the pixels in the at least one of the multiple blocks. The separating and determining are performed by a generative model included in one or more components executed by one or more computer subsystems. The generative model includes a non-linear network configured for mapping blocks of pixels of an input feature map volume into labels. The labels are indicative of one or more defect-related characteristics of the blocks. The method also includes selecting one of the labels for the at least one of the multiple blocks based on the determined feature and the mapping of the blocks of the pixels of the input feature map volume into the labels. In addition, the method includes detecting defects in the portion of the specimen based on the selected label for the at least one of the multiple blocks. The detecting is performed by the one or more computer subsystems.

Each of the steps of the method described above may he further performed as described further herein. In addition, the embodiment of the method described above may include any other step(s) of any other method(s) described herein. Furthermore, the method described above may be performed by any of the systems described herein.

Another embodiment relates to a non-transitory computer-readable medium storing program instructions executable on a computer system for performing a computer-implemented method for detecting defects on a specimen. The computer-implemented method includes the steps of the method described above. The computer-readable medium may be further configured as described herein. The steps of the computer-implemented method may be performed as described further herein. In addition, the computer-implemented method for which the program instructions are executable may include any other step(s) of any other method(s) described herein.

BRIEF DESCRIPTION OF THE DRAWINGS

Further advantages of the present invention will become apparent to those skilled in the art with the benefit of the following detailed description of the preferred embodiments and upon reference to the accompanying drawings in which.

Figure 1:
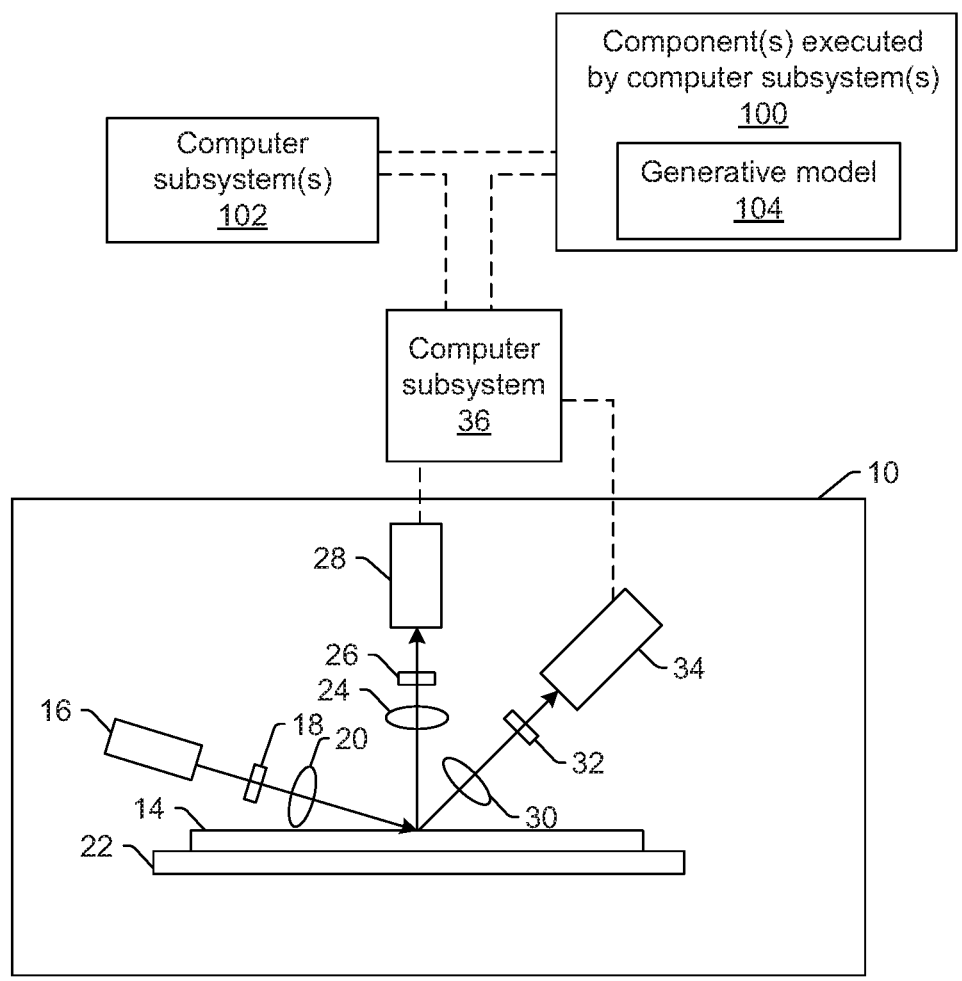
FIGS. 1 and 1a are schematic diagrams illustrating side views of embodiments of a system configured as described herein.

While the invention is susceptible to various modifications and alternative forms, specific embodiments thereof are shown by way of example in the drawings and are herein described in detail. The drawings may not be to scale. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENTS

The terms "design," "design data," and "design information" as used interchangeably herein generally refer to the physical design (layout) of an IC and data derived from the physical design through complex simulation or simple geometric and Boolean operations. In addition, an image of a reticle acquired by a reticle inspection system and/or derivatives thereof can be used as a "proxy" or "proxies" for the design. Such a reticle image or a derivative thereof can serve as a substitute for the design layout in any embodiments described herein that use a design. The design may include any other design data or design data proxies described in commonly owned U.S. Pat. No. 7,570,796 issued on Aug. 4, 2009 to Zafar et al. and U.S. Pat. No. 7,676,077 issued on Mar. 9, 2010 to Kulkarni et al., both of which are incorporated by reference as if fully set forth herein. In addition, the design data can be standard cell library data, integrated layout data, design data for one or more layers, derivatives of the design data, and full or partial chip design data.

In addition, the "design," "design data," and "design information" described herein refers to information and data that is generated by semiconductor device designers in a design process and is therefore available for use in the embodiments described herein well in advance of printing of the design on any physical specimens such as reticles and wafers.

Turning now to the drawings, it is noted that the figures are not drawn to scale. In particular, the scale of some of the elements of the figures is greatly exaggerated to emphasize characteristics of the elements. It is also noted that the figures are not drawn to the same scale. Elements shown in more than one figure that may be similarly configured have been indicated using the same reference numerals. Unless otherwise noted herein, any of the elements described and shown may include any suitable commercially available elements.

One embodiment relates to a system configured to detect defects on a specimen. One embodiment of such a system is shown in FIG. 1. The system includes one or more computer subsystems (e.g., computer subsystems 36 and 102) and one or more components 100 executed by the one or more computer subsystems. In some embodiments, the system includes imaging system (or subsystem) 10. In general, the imaging subsystem is configured for generating images of a specimen. For example, as described further herein and shown in FIGS. 1 and 1a, the imaging subsystem includes at least an energy source configured to direct energy to the specimen and at least a detector configured to detect energy from the specimen. The imaging subsystem may do so by scanning energy over a physical version of the specimen while detecting energy from the specimen to thereby generate the images for the specimen. The imaging subsystem may also be configured to perform the scanning and the detecting with multiple modes.

In one embodiment, the specimen is a wafer. The wafer may include any wafer known in the art. In another embodiment, the specimen is a reticle. The reticle may include any reticle known in the art.

In one embodiment, the imaging subsystem is an optical based imaging subsystem. For example, the energy directed to the specimen may include light, and the energy detected from the specimen may include light. In one such example, in the embodiment of the system shown in FIG. 1, imaging subsystem 10 includes an illumination subsystem configured to direct light to specimen 14. The illumination subsystem includes at least one light source. For example, as shown in FIG. 1, the illumination subsystem includes light source 16. In one embodiment, the illumination subsystem is configured to direct the light to the specimen at one or more angles of incidence, which may include one or more oblique angles and/or one or more normal angles. For example, as shown in FIG. 1, light from light source 16 is directed through optical element 18 and then lens 20 to specimen 14 at an oblique angle of incidence. The oblique angle of incidence may include any suitable oblique angle of incidence, which may vary depending on, for instance, characteristics of the specimen.

The imaging subsystem may be configured to direct the light to the specimen at different angles of incidence at different times. For example, the imaging subsystem may be configured to alter one or more characteristics of one or more elements of the illumination subsystem such that the light can be directed to the specimen at an angle of incidence that is different than that shown in FIG. 1. In one such example, the imaging subsystem may be configured to move light source 16, optical element 18, and lens 20 such that the light is directed to the specimen at a different oblique angle of incidence or a normal (or near normal) angle of incidence.

In some instances, the imaging subsystem may be configured to direct light to the specimen at more than one angle of incidence at the same time. For example, the illumination subsystem may include more than one illumination channel, one of the illumination channels may include light source 16, optical element 18, and lens 20 as shown in FIG. 1 and another of the illumination channels (not shown) may include similar elements, which may be configured differently or the same, or may include at least a light source and possibly one or more other components such as those described further herein. If such light is directed to the specimen at the same time as the other light, one or more characteristics (e.g., wavelength, polarization, etc.) of the light directed to the specimen at different angles of incidence may be different such that light resulting from illumination of the specimen at the different angles of incidence can be discriminated from each other at the detector(s).

In another instance, the illumination subsystem may include only one light source (e.g., source 16 shown in FIG. 1), and light from the light source may be separated into different optical paths (e.g., based on wavelength, polarization, etc.) by one or more optical elements (not shown) of the illumination subsystem. Light in each of the different optical paths may then be directed to the specimen. Multiple illumination channels may be configured to direct light to the specimen at the same time or at different times (e.g., when different illumination channels are used to sequentially illuminate the specimen). In another instance, the same illumination channel may be configured to direct light to the specimen with different characteristics at different times. For example, in some instances, optical element 18 may be configured as a spectral filter and the properties of the spectral filter can be changed in a variety of different ways (e.g., by swapping out the spectral filter) such that different wavelengths of light can be directed to the specimen at different times. The illumination subsystem may have any other suitable configuration known in the art for directing the light having different or the same characteristics to the specimen at different or the same angles of incidence sequentially or simultaneously.

In one embodiment, light source 16 may include a broadband plasma (BBP) light source. In this manner, the light generated by the light source and directed to the specimen may include broadband light. However, the light source may include any other suitable light source such as a laser. The laser may include any suitable laser known in the art and may be configured to generate light at any suitable wavelength or wavelengths known in the art. In addition, the laser may be configured to generate light that is monochromatic or nearly-monochromatic. In this manner, the laser may be a narrowband laser. The light source may also include a polychromatic light source that generates light at multiple discrete wavelengths or wavebands.

Light from optical element 18 may be focused onto specimen 14 by lens 20. Although lens 20 is shown in FIG. 1 as a single refractive optical element, it is to be understood that, in practice, lens 20 may include a number of refractive and/or reflective optical elements that in combination focus the light from the optical element to the specimen. The illumination subsystem shown in FIG. 1 and described herein may include any other suitable optical elements (not shown). Examples of such optical elements include, but are not limited to, polarizing component(s), spectral filter(s), spatial filter(s), reflective optical element(s), apodizer(s), beam splitter(s), aperture(s), and the like, which may include any such suitable optical elements known in the art. In addition, the imaging subsystem may be configured to alter one or more of the elements of the illumination subsystem based on the type of illumination to be used for imaging.

The imaging subsystem may also include a scanning subsystem configured to cause the light to be scanned over the specimen. For example, the imaging subsystem may include stage 22 on which specimen 14 is disposed during inspection. The scanning subsystem may include any suitable mechanical and/or robotic assembly (that includes stage 22) that can be configured to move the specimen such that the light can be scanned over the specimen. In addition, or alternatively, the imaging subsystem may be configured such that one or more optical elements of the imaging subsystem perform some scanning of the light over the specimen. The light may be scanned over the specimen in any suitable fashion such as in a serpentine-like path or in a spiral path.

The imaging subsystem further includes one or more detection channels. At least one of the one or more detection channels includes a detector configured to detect light from the specimen due to illumination of the specimen by the system and to generate output responsive to the detected light. For example, the imaging subsystem shown in FIG. 1 includes two detection channels, one formed by collector 24, element 26, and detector 28 and another formed by collector 30, element 32, and detector 34. As shown in FIG. 1, the two detection channels are configured to collect and detect light at different angles of collection. In some instances, both detection channels are configured to detect scattered light, and the detection channels are configured to detect light that is scattered at different angles from the specimen. However, one or more of the detection channels may be configured to detect another type of light from the specimen (e.g., reflected light).

As further shown in FIG. 1, both detection channels are shown positioned in the plane of the paper and the illumination subsystem is also shown positioned in the plane of the paper. Therefore, in this embodiment, both detection channels are positioned in (e.g., centered in) the plane of incidence. However, one or more of the detection channels may be positioned out of the plane of incidence. For example, the detection channel formed by collector 30, element. 32, and detector 34 may be configured to collect and detect light that is scattered out of the plane of incidence. Therefore, such a detection channel may be commonly referred to as a "side" channel, and such a side channel may be centered in a plane that is substantially perpendicular to the plane of incidence.

Although FIG. 1 shows an embodiment of the imaging subsystem that includes two detection channels, the imaging subsystem may include a different number of detection channels (e.g., only one detection channel or two or more detection channels). In one such instance, the detection channel formed by collector 30, element 32, and detector 34 may form one side channel as described above, and the imaging subsystem may include an additional detection channel (not shown) formed as another side channel that is positioned on the opposite side of the plane of incidence. Therefore, the imaging subsystem may include the detection channel that includes collector 24, element 26, and detector 28 and that is centered in the plane of incidence and configured to collect and detect light at scattering angle(s) that are at or close to normal to the specimen surface. This detection channel may therefore be commonly referred to as a "top" channel, and the imaging subsystem may also include two or more side channels configured as described above. As such, the imaging subsystem may include at least three channels (i.e., one top channel and two side channels), and each of the at least three channels has its own collector, each of which is configured to collect light at different scattering angles than each of the other collectors.

As described further above, each of the detection channels included in the imaging subsystem may be configured to detect scattered light. Therefore, the imaging subsystem shown in FIG. 1 may be configured for dark field (DF) imaging of specimens. However, the imaging subsystem may also or alternatively include detection channel(s) that are configured for bright field (BF) imaging of specimens. In other words, the imaging subsystem may include at least one detection channel that is configured to detect light specularly reflected from the specimen. Therefore, the imaging subsystems described herein may be configured for only DF, only BF, or both DF and BF imaging. Although each of the collectors are shown in FIG. 1 as single refractive optical elements, it is to be understood that each of the collectors may include one or more refractive optical element(s) and/or one or more reflective optical element(s).

The one or more detection channels may include any suitable detectors known in the art. For example, the detectors may include photo-multiplier tubes (PMTs), charge coupled devices (CCDs), time delay integration (TDI) cameras, and any other suitable detectors known in the art. The detectors may also include non-imaging detectors or imaging detectors. In this manner, if the detectors are non-imaging detectors, each of the detectors may be configured to detect certain characteristics of the scattered light such as intensity but may not be configured to detect such characteristics as a function of position within the imaging plane. As such, the output that is generated by each of the detectors included in each of the detection channels of the imaging subsystem may be signals or data, but not image signals or image data. In such instances, a computer subsystem such as computer subsystem 36 may be configured to generate images of the specimen from the non-imaging output of the detectors. However, in other instances, the detectors may be configured as imaging detectors that are configured to generate imaging signals or image data. Therefore, the imaging subsystem may be configured to generate the images described herein in a number of ways.

It is noted that FIG. 1 is provided herein to generally illustrate a configuration of an imaging system or subsystem that may be included in the system embodiments described herein or that may generate images that are used by the system embodiments described herein. Obviously, the imaging subsystem configuration described herein may be altered to optimize the performance of the imaging subsystem as is normally performed when designing a commercial imaging system. In addition, the systems described herein may be implemented using an existing system (e.g., by adding functionality described herein to an existing system) such as the 29xx/28xx series of tools that are commercially available from KLA-Tencor, Milpitas, Calif. For some such systems, the embodiments described herein may be provided as optional functionality of the system (e.g., in addition to other functionality of the system). Alternatively, the imaging subsystem described herein may be designed "from scratch" to provide a completely new imaging subsystem.

Computer subsystem 36 may be coupled to the detectors of the imaging subsystem in any suitable manner (e.g., via one or more transmission media, which may include "wired" and/or "wireless" transmission media) such that the computer subsystem can receive the output generated by the detectors during scanning of the specimen. In this manner, the computer subsystem is coupled to the imaging subsystem. In addition, the computer subsystem is configured for acquiring a single test image for a portion of the specimen generated by the imaging subsystem. For example, the computer subsystem and any other computer subsystem described herein may be configured to acquire such a single test image from the detector and/or as described further herein. Computer subsystem 36 may be configured to perform a number of functions described further herein using the output of and/or images generated by the detectors.

The computer subsystems shown in FIG. 1 (as well as other computer subsystems described herein) may also be referred to herein as computer system(s). Each of the computer subsystem(s) or system(s) described herein may take various forms, including a personal computer system, image computer, mainframe computer system, workstation, network appliance, Internet appliance, or other device. In general, the term "computer system" may be broadly defined to encompass any device having one or more processors, which executes instructions from a memory medium. The computer subsystem(s) or system(s) may also include any suitable processor known in the art such as a parallel processor. In addition, the computer subsystem(s) or system (s) may include a computer platform with high speed processing and software, either as a standalone or a networked tool. Furthermore, the computer subsystem(s) may include one or more graphics processing units (GPUs) and/or one or more central processing units (CPUs).

If the system includes more than one computer subsystem, then the different computer subsystems may be coupled to each other such that images, data, information, instructions, etc. can be sent between the computer subsystems as described further herein. For example, computer subsystem 36 may be coupled to computer subsystem(s) 102 as shown by the dashed line in FIG. 1 by any suitable transmission media, which may include any suitable wired and/or wireless transmission media known in the art. Two or more of such computer subsystems may also be effectively coupled by a shared computer-readable storage medium (not shown).

Although the imaging subsystem is described above as being an optical or light-based imaging subsystem, the imaging subsystem may be an electron beam based imaging subsystem. In one such embodiment, the energy directed to the specimen includes electrons, and the energy detected from the specimen includes electrons. In t manner, the imaging subsystem may include at least an energy source configured to generate electrons that are directed to the specimen and at least a detector configured to detect electrons from the specimen. In one such embodiment shown in FIG. 1a, the imaging subsystem includes electron column 122 coupled to computer subsystem 124.

Figure 1A:
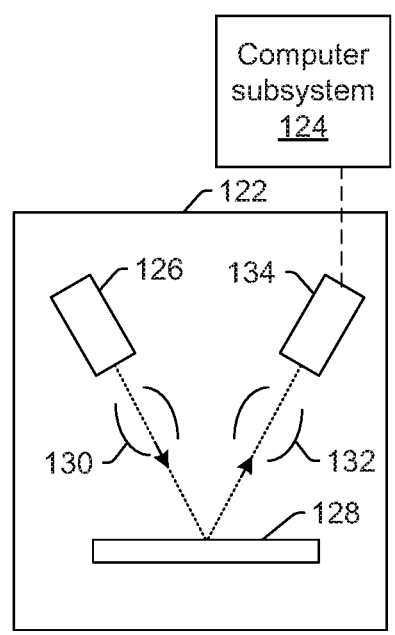

As also shown in FIG. 1a, the electron column includes electron beam source 126 configured to generate electrons that are focused to specimen 128 by one or more elements 130. The electron beam source may include, for example, a cathode source or emitter tip, and one or more elements 130 may include, for example, a gun lens, an anode, a beam limiting aperture, a gate valve, a beam current selection aperture, an objective lens, and a scanning subsystem, all of which may include any such suitable elements known in the art.

Electrons returned from the specimen (e.g., secondary electrons) may be focused by one or more elements 132 to detector 134. One or more elements 132 may include, for example, a scanning subsystem, which may be the same scanning subsystem included in element(s) 130.

The electron column may include any other suitable elements known in the art. In addition, the electron column may be further configured as described in U.S. Pat. No. 8,664,594 issued Apr. 4, 2014 to Jiang et al., U.S. Pat. No. 8,692,204 issued Apr. 8, 2014 to Kojima et al, U.S. Pat. No. 8,698,093 issued Apr. 15, 2014 to Gubbens et al., and U.S. Pat. No. 8,716,662 issued May 6, 2014 to MacDonald et al., which are incorporated by reference as if fully set forth herein.

Although the electron column is shown in FIG. 1a as being configured such that the electrons are directed to the specimen at an oblique angle of incidence and are scattered from the specimen at another oblique angle, it is to be understood that the electron beam may be directed to and scattered from the specimen at any suitable angles. In addition, the electron beam based imaging subsystem may be configured to use multiple modes to generate images of the specimen as described further herein (e.g., with different illumination angles, collection angles, etc.). The multiple modes of the electron beam based imaging subsystem may be different in any image generation parameters of the imaging subsystem.

Computer subsystem 124 may be coupled to detector 134 as described above. The detector may detect electrons returned from the surface of the specimen thereby forming electron beam images of the specimen. The electron beam images may include any suitable electron beam images. Computer subsystem 124 may be configured to perform one or more functions described further herein for the specimen using output and/or images generated by detector 134. Computer subsystem 124 may be configured to perform any additional step(s) described herein. A system that includes the imaging subsystem shown in FIG. 1a may be further configured as described herein.

It is noted that FIG. 1a is provided herein to generally illustrate a configuration of an electron beam based imaging subsystem that may be included in the embodiments described herein. As with the optical imaging subsystem described above, the electron beam based imaging subsystem configuration described herein may be altered to optimize the performance of the imaging subsystem as is normally performed when designing a commercial imaging subsystem. In addition, the systems described herein may be implemented using an existing subsystem (e.g., by adding functionality described herein to an existing system) such as the eSxxx and eDR-xxxx series of tools that are commercially available from KLA-Tencor. For some such systems, the embodiments described herein may be provided as optional functionality of the system (e.g., in addition to other functionality of the system). Alternatively, the subsystem described herein may be designed "from scratch" to provide a completely new system.

Figure 2:
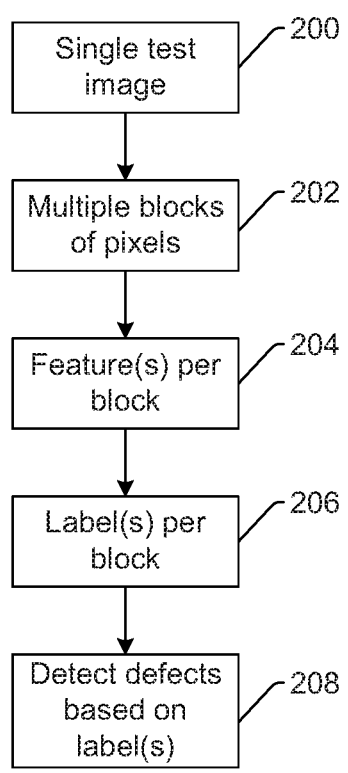
FIG. 2 is a flow chart illustrating one embodiment of steps that may be performed by system embodiments described herein.

Although the imaging subsystem is described above as being a light-based or electron beam-based imaging subsystem, the imaging subsystem may be an ion beam-based imaging subsystem. Such an imaging subsystem may be configured as shown in FIG. 2 except that the electron beam source may be replaced with any suitable ion beam source known in the art. In addition, the imaging subsystem may be any other suitable ion beam-based imaging subsystem such as those included in commercially available focused ion beam (FIB) systems, helium ion microscopy (HIM) systems, and secondary ion mass spectroscopy (SIMS) systems. Furthermore, the imaging subsystem may in some cases be configured as an x-ray-based imaging subsystem. In this manner, the energy that is directed to the specimen may include x-rays. An x-ray-based imaging subsystem may be configured as described in U.S. Pat. No. 6,891,627 issued on May 10, 2005 to Levy et al., which is incorporated by reference as if fully set forth herein. The embodiments described herein may be further configured as described in this patent, As noted above, the imaging subsystem is configured for directing energy to a physical version of the specimen thereby generating actual images for the physical version of the specimen. In this manner, the imaging subsystem may be configured as an "actual" imaging system, rather than a "virtual" system. For example, a storage medium (not shown) and computer subsystem(s) 102 shown in FIG. 1 may be configured as a "virtual" system. In particular, the storage medium and the computer subsystem(s) are not part of imaging subsystem 10 and do not have any capability for handling the physical version of the specimen. In other words, in systems configured as virtual systems, the output of its one or more "detectors" may be output that was previously generated by one or more detectors of an actual system and that is stored in the virtual system, and during the "scanning," the virtual system may replay the stored output as though the specimen is being scanned. In this manner, scanning the specimen with a virtual system may appear to be the same as though a physical specimen is being scanned with an actual system, while, in reality, the "scanning" involves simply replaying output for the specimen in the same manner as the specimen may be scanned. Systems and methods configured as "virtual" inspection systems are described in commonly assigned U.S. Pat. No. 8,126,255 issued on Feb. 28, 2012 to Bhaskar et al. and U.S. Pat. No. 9,222,895 issued on Dec. 29, 2015 to Duffy et al., both of which are incorporated by reference as if fully set forth herein. The embodiments described herein may be further configured as described in these patents. For example, the one or more computer subsystems described herein may be further configured as described in these patents.

As further noted above, the imaging subsystem may be configured to generate images of the specimen with multiple modes. In general, a "mode" can be defined by the values of parameters of the imaging subsystem used for generating images of a specimen or the output used to generate images of the specimen. Therefore, modes that are different may be different in the values for at least one of the imaging parameters of the imaging subsystem. For example, in one embodiment in which the energy scanned over the specimen and the energy detected from the specimen is light, at least one of the multiple modes uses at least one wavelength of the light for illumination that is different from at least one wavelength of the light for illumination used for at least one other of the multiple modes. The modes may be different in the illumination wavelength as described further herein (e.g., by using different light sources, different spectral filters, etc.) for different modes. In another embodiment, at least one of the multiple modes uses an illumination channel of the imaging subsystem that is different from an illumination channel of the imaging subsystem used for at least one other of the multiple modes. For example, as noted above, the imaging subsystem may include more than one illumination channel. As such, different illumination channels may be used for different modes.

In one embodiment, the imaging subsystem is an inspection subsystem. For example, the optical and electron beam imaging subsystems described herein may be configured as inspection subsystems. In another embodiment, the imaging subsystem is a defect review subsystem. For example, the optical and electron beam imaging subsystems described herein may be configured as defect review subsystems. In a further embodiment, the imaging subsystem is a metrology subsystem. For example, the optical and electron beam imaging subsystems described herein may be configured as metrology subsystems. In particular, the embodiments of the imaging subsystems described herein and shown in FIGS. 1 and 1a may be modified in one or more parameters to provide different imaging capability depending on the application for which they will be used. In one such example, the imaging subsystem shown in FIG. 1 may be configured to have a higher resolution if it is to be used for defect review or metrology rather than for inspection. In other words, the embodiments of the imaging subsystem shown in FIGS. 1 and 1a describe some general and various configurations for an imaging subsystem that can be tailored in a number of manners that will be obvious to one skilled in the art to produce imaging subsystems having different imaging capabilities that are more or less suitable for different applications.

The inspection subsystem, defect review subsystem, and metrology subsystem may also be configured for inspection, defect review, and metrology of specimens such as wafers and reticles. For example, the embodiments described herein may be configured for using a generative model for the purposes of mask inspection and wafer inspection. In particular, the generative model embodiments described herein may be installed on a computer node or computer cluster that is a component of or coupled to an imaging subsystem such as a broadband plasma inspector, an electron beam inspector or defect review tool, a mask inspector, a virtual inspector, etc. In this manner, the embodiments described herein may be used for a variety of applications that include, but are not limited to, wafer inspection, mask inspection, electron beam inspection and review, etc. The characteristics of the imaging subsystems shown in FIGS. 1 and 1a can be modified as described above based on the specimen for which it will generate actual images.

The component(s), e.g., component(s) 100 shown in FIG. 1, executed by the computer subsystem(s), e.g., computer subsystems 36 and/or 102, include generative model 104. A "generative" model can be generally defined as a model that is probabilistic in nature. In other words, a. "generative" model is not one that performs forward simulation or rule-based approaches. As such, when a generative model is used to perform a simulation as described further herein, a model of the physics of the processes involved in generating an actual image (for which a simulated image is being generated) is not necessary. Instead, as described further herein, the generative model can be learned (in that its parameters can be learned) based on a suitable training set of data. As described further herein, such generative models have a number of advantages for the embodiments described herein.

The generative model includes a non-linear network configured for mapping blocks of pixels of an input feature map volume into labels, and the labels are indicative of one or more defect-related characteristics of blocks. For example, a convolutional neural network (CNN) is a non-linear network mapping each given block (e.g., M×N) of an input feature map volume into a label. The blocks are blocks of pixels, which may have any suitable size. One non-limiting example of a size of the blocks may be 50 pixels by 50 pixels. The blocks of pixels into which an image is separated may include a block of some size surrounding (and centered on when possible) each pixel in the image. In this manner, one block for one pixel in the image may include some pixels that are also in another block for another pixel. However, each block will preferably include a set of pixels that is not the same as the set of pixels of any other block (i.e., no two of the blocks completely overlap in pixel space). In addition, in some instances, the blocks may be mutually exclusive of each other. For example, pixels included in one block may not be included in any other block into which the image is separated. In such an instance, the blocks may be seen as non-overlapping tiles within the image. Furthermore, the blocks may include a combination of 1) some blocks that are mutually exclusive of all other blocks in the image and 2) some blocks that overlap with other blocks to some degree. The blocks in the image may also not extend across the entirety of the image. In this manner, some of the pixels in the image may not be included in any of the blocks. In addition, in one optimization approach, the labeling may be based on the pixel level instead of the imaging level, which enables reducing the dataset from millions of images to a few tens of images.

In one embodiment, the labels indicate whether input features in the input feature map volume are associated with defects or are not associated with defects. For example, the labels may include "no defect" labels, and "defect" labels. Other similar phrases and/or numbers may be used as labels to differentiate whether input features are associated with defects or not. The labels may be further configured and assigned as described herein.

In another embodiment, the labels indicate a type of defect to which input features in the input feature map volume are associated. For example, the labels may include "Class x" labels, "Class y" labels, etc., Where x and y may be some phrase and/or number that differentiates one class of defects from another class of defects. These labels may also be further configured and assigned as described herein.

The embodiments described herein, therefore, rely on a new type of neural network, which may be sometimes called machine learning, deep learning, or CNN, etc, This type of approach is sometimes referred to as an end-to-end learning strategy. For example, in one embodiment, the generative model is a deep generative model. In another embodiment, the generative model is a machine learning model. For example, the generative model may be configured to have a deep learning architecture in that the generative model may include multiple layers, which perform a number of algorithms or transformations. The generative model may also include one or more encoder side layers and/or one or more decoder side layers. The number of layers on one or both sides of the generative model may vary and is generally use case dependent. The deep generative and machine learning models may include any such suitable models known in the art that can be configured to perform the functions described herein.

In another embodiment, the generative model is a CNN. For example, the embodiments described herein can take advantage of deep learning concepts such as a CNN to solve the normally intractable representation conversion problem rendering). The generative model may have any CNN configuration or architecture known in the art. In general, a large variety of different CNN architectures are possible and known in the art.

The embodiments described herein can also be modified in a number of ways. For example, alternatives to the generative model described herein can be constructed via (1) generative adversarial nets (GAN) with pyramid up-sampling; (2) CNN with densification (i.e., stride=1); (3) recurrent neural network (RNN) with variational auto-encoder (VAE); or (4) Deep Boltzmann Machine with convolutional and deconvolutional layers. Such alternatives can be implemented using any suitable architecture known in the art.

The one or more computer subsystems are configured for inputting the single test image into the generative model. For example, as shown in FIG. 2, single test image 200 may be input to the generative model. The single test image may be input to the generative model in any suitable manner by the computer subsystem(s).

The generative model is configured for separating the single test image into multiple blocks of pixels. For example, as shown in FIG. 2, single test image 200 may be separated into multiple blocks of pixels 202. The generative model may be configured to separate the single test image into any of the blocks described further herein in any suitable manner. In particular, the blocks of pixels into which a single test image is separated by the generative model may have any of the characteristics of the blocks described herein.

The generative model is also configured for, for at least one of the multiple blocks of pixels, determining a feature of the at least one of the multiple blocks based on only the pixels in the at least one of the multiple blocks. For example, as shown in FIG. 2, the generative model is configured for determining feature(s) per block 204 for multiple blocks of pixels 202. The feature(s) are therefore determined based on only the pixels in the blocks and not based on any additional pixels that may be within the image and not in the block for which the feature(s) are being determined. For any one block, one or more features may be determined as described herein, and all, some, or not all of the features determined for any one block may be used as described further herein. The one or more features determined for any one block may be determined based on the single test image only or based on the single test image and one or more of multiple perspectives for the single test image, which may include any of the multiple perspectives described herein. For example, for a block in a single test image, one feature may be determined for the single test image and each of the multiple perspectives for the single test image that are input to the generative model by the computer subsystem(s).

In any of the embodiments described herein, the features may include vectors of scalar values, vectors of independent distributions, or joint distributions. In some embodiments, the features include vectors of independent distributions, and the vectors of independent distributions include Bernoulli, binomial, multinomial, Poisson binomial, beta-binomial, multinomial, Boltzmann, Poisson, Conway-Maxwell-Poisson, Beta, Gaussian/Normal, Skew normal, Rayleigh, Laplace, gamma, pareto, or student-t distributions. In another embodiment, the features include joint distributions, and the joint distributions include Multivariate Gaussian/Normal, multivariate student-t, Dirichlet, matrix Gaussian/normal, or matrix t-distributions. The features may, however, include any other suitable types of features known in the art. The different types of features may be learned or inferred in any suitable manner known in the art.

The generative model is further configured for selecting one of the labels for the at least one of the multiple blocks based on the determined feature and the mapping of the blocks of the pixels of the input feature map volume into the labels. For example, as shown in FIG. 2, the generative model is configured for selecting labels) per block 206 based on feature(s) per block 204. In particular, the generative model may determine feature(s) for each block and then use the mapping to determine which labels correspond to those features.

The computer subsystem(s) are further configured for detecting defects in the portion of the specimen based on the selected label for the at least one of the multiple blocks. For example, as shown in FIG. 2, the computer subsystem(s) are configured for detecting defects based on label(s) 208. In particular, as described above, the labels may each be associated with an indication of whether or not a feature is associated with a defect. Therefore, based on the label that is output by the generative model for a block within an image input to the generative model by the computer subsystem(s), the computer subsystem(s) may be configured to detect defects in the blocks based on the labels. In this manner, the embodiments described herein enable an inspector to detect defects using a single image (i.e., "single image detection (SID)), where the input is an image of the specimen and the output is defect detection results such as a probability map for defects. In addition, the embodiments described herein are configured for performing SID based on CNN and other generative models described herein. The embodiments described herein may also use a machine learning system for SID with or without design information (as described further herein) for semiconductor applications (e.g., reticles, masks, optical inspectors, as well as e-beam and x-ray inspectors).

In some embodiments, the computer subsystem(s) are configured for determining a type of the defects in the portion of the specimen based on the selected label for the at least one of the multiple blocks. :In this manner, the embodiments described herein enable an inspector to classify defects using a single test image (i.e., "single image classification" (SIC)). For example, as described above, the labels may each be associated with a type or class of defects. Therefore, based on the label that is output by the generative model for a block within an image input to the generative model by the computer subsystem(s), the computer subsystem(s) may be configured to determine a type or class of the defects detected in the blocks based on the labels.

In some instances, one single test image may be separated into multiple smaller blocks and features may be determined for each block. In this manner, the generative model may generate a feature "map" for the smaller blocks within the larger image (where the map represents the features as a function of block position within the single test image). However, the generative model may be configured to, in some such instances, output only a single label for the image as a whole based on each of the features determined for each of the blocks in the single test image. As such, although the feature(s) may be determined for more than one of the multiple blocks, selecting one of the labels for the at least one of the multiple blocks may include selecting only one of the labels for a combination of (more than one of) the multiple blocks (e.g., all of the multiple blocks in the single test image). For instance, the single label may be a "defect" or "no defect" label. In one such instance, if none of the blocks are assigned feature(s) and/or label(s) that correspond to defects, then the generative model may output a "no defect" label for the single test image as a whole. In contrast, if at least one of the blocks is assigned feature(s) and/or label(s) that correspond to a defect, then the generative model may output a "defect" label for the single test image as a whole.

In this manner, the complete single test image may be processed as one large block, and the output of the generative model may not be a labeled map but just a single, defect-presence indicating label such as a "defect" or "no defect" label or a single class label. By back propagating this information, e.g., which portion(s) or block(s) of the input image was responsible for the final decision, the spatial information can be retrieved from the actual defect location.

The label(s) that are output by the generative model as described herein can, therefore, be indicative of whether there is a defect in the whole image (i.e., the single test image as a whole), not in one or more blocks of pixels within the image. In addition, it can be that the individual blocks are free of defects, but their arrangement is invalid (e.g., when considering the image at a larger scale than the individual blocks). For example, the feature(s) determined for each of the multiple blocks may themselves be mapped to labels that indicate no defect is present. However, the spatial relationship between two feature(s) (e.g., a first feature determined for a first block and a second feature determined for a second block that is adjacent to the first block) may be indicative of a defect in the single test image. In this manner, the generative model can produce multiple maps of features corresponding to multiple block size.

The embodiments described herein are also useful for a number of different applications. For example, the embodiments described herein may be configured for and used for performing SID only, SID with automatic defect classification (ADC), SID with CAD for detection, SID with CAD for detection and ADC, and SID with multiple perspectives for detection and ADC. In this manner, the embodiments described herein can replace standard die-to-die algorithms providing better accuracy and speed.

To support all of these use cases, only the input volume of the feature map may be modified. The input volume is essentially the number of representations (which are commonly referred to as channels within the algorithm framework). Input to SID with CAD (or other design information described herein) may be an image of the specimen and design information for that specimen, and output is defect detection results such as a probability map for defects. In addition, SID and SID with CAD can be used for classifying just defects or background (detection) or between defect types and background (ADC).

In another embodiment, the one or more computer subsystems are configured for generating multiple perspectives of the single test image, and the single test image input by the one or more computer subsystems into the generative model includes the multiple perspectives of the single test image. Multiple perspectives, in the context of the embodiments described herein, refers to different representations of the same raw data produced via image processing. Therefore, SID in the context of the embodiments described herein refers to the detection of defects using only a single test image acquired from a physical specimen using an imaging subsystem although that SID may also be performed using multiple images generated from that one single test image. In this manner, the multiple perspectives may be generated by image processing, which may include any suitable image processing and may be performed by the computer subsystem(s) and/or generative model described herein.

The embodiments described herein can be implemented efficiently using a convolutional approach running on a GPU. However, the embodiments described herein may be implemented with or without GPU(s) (e.g., with central processing units (CPUs) instead). In addition, the inventors have measured substantially short processing times for the defect detection described herein compared to old methods. The performance observed by the inventors for the defect detection described herein also outperforms the old methods based on two images in terms of both SNR and classification accuracy.

In one embodiment, detecting the defects does not include aligning the single test image to any other image. In another embodiment, detecting the defects does not include comparing the single test image to any other image. For example, unlike defect detection that involves comparing one image to another reference image for defect detection, the embodiments described herein do not require alignment between different images prior to defect detection. In addition, even if the defect detection and other functions described herein involve using multiple perspectives of the same single test image, since the multiple perspectives are generated from the same single test image, there will be no alignment errors between any of the multiple perspectives and the single test image. Therefore, any misalignment uncertainty and/or errors between two images that might be inherent in other methods and systems for defect detection will not adversely affect defect detection performed by the embodiments described herein. In addition, since the defect detection does not involve comparing one image to another image, the method will have fewer error and noise sources from the reference than other methods and systems for defect detection.

In a further embodiment, detecting the defects does not include statistical based defect detection. For example, as described further herein, some defect detection methods may involve a single test image and statistical analysis to determine outliers in a scatterplot compared to data for a reference image or other non-defect data. However, the embodiments described herein do not comprise generating any such scatterplots or other statistical analysis. Instead, once the generative model has been trained as described further herein, the mapping of the generative model can be used to map a feature of a single test image to a label indicating if and possibly what kind of defect is present in the image.

In some embodiments, the one or more computer subsystems are configured for detecting the defects based on the selected label in combination with design information for the specimen. For example, as described further herein, the defect detection performed by the computer subsystem(s) may include SID with CAD. The CAD or other design information may be used for defect detection as described further herein (e.g., information about the design may be used as a feature in the mapping to determine if a defect is present and possibly what kind of defect is present).

In another embodiment, the one or more computer subsystems are configured for detecting the defects based on the selected label and without design information for the specimen. For example, as described further herein, the embodiments may be configured for SID without CAD or other design information. In this manner, the only features that are used for defect detection and possibly defect classification may include the features that are determined for the single test image and that are mapped to the labels.

In one embodiment, the computer subsystem(s) are configured for generating a training dataset used for training the generative model, and the training dataset includes a set of pairs of a portion of design information for the specimen and an image generated for the portion of the design information. In this manner, the embodiments described herein may be configured for data set preparation (multi-dimension input feature maps). For example, the data set preparation may include collecting a set of images (e.g., SEM images with or without defects). The images may include SEM images but also or alternatively any other "ground truth" information such as SEM images, optical images, mask inspection images, metrology data, prior layer optical data, etc. The images generated for the portion of the design information may also not be acquired by imaging the specimen. For example, metrology data may be generated by performing measurements on a specimen using a metrology system and then the metrology data may be processed to generate images of the specimen that are used in the pairs in the training dataset. In other words, in some instances, non-image data may be used to generate images of a specimen. In general, the images may all be of the same type. The images may also be generated using different imaging modes. Furthermore, the images may include raw or processed images.

Dataset preparation may include rendering and aligning corresponding design clips with the images. The design information may include any of the design information described herein. For example, in one embodiment, the design information is design data such as CAD data. Although some embodiments may be described herein with respect to CAD or CAD data or images, it is to be understood that the embodiments described herein may use any other design information described herein. In another example, the computer subsystem(s) may be configured to acquire design clips for the specimen and to render the design clips to generate the design information, which may or may not look like images from the specimen. The rendering can range from simple rendering (binary images) to more sophisticated rendering (mimicking specimen data). The rendering may be further performed as described herein (with respect to simulations).

Figure 3:
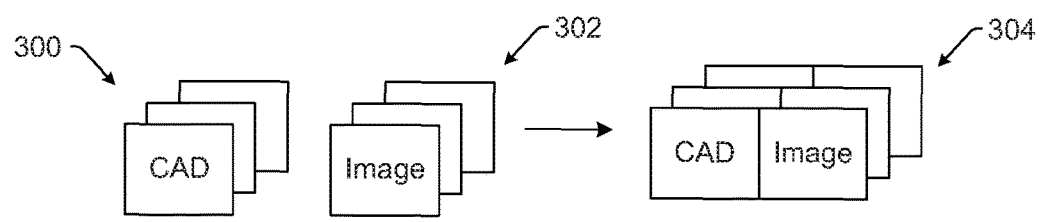
FIG. 3 is a schematic diagram illustrating one embodiment of a training dataset that may be generated by embodiments described herein.

The computer subsystem(s) may, therefore, prepare a training dataset. In this step, a training dataset may be generated by alignment and image cropping of CAD and real images, resulting in a collection of pairs of aligned CAD and real image (e.g., SEM or optical image), wherein "real" images are those that are generated by imaging a physical specimen on which the design information has been formed. In particular, as shown in FIG. 3, different portions 300 of CAD and their corresponding actual images 302 may be aligned and cropped to produce pairs 304 of corresponding CAD portions and actual images.

The CAD may be rendered as a binary image and uneven pixel size may be restored before alignment. The pixel size may be "uneven" due to image distortion from hardware. For example, in an electron beam image, due to the instability of the electron beam, a pixel at a first location on a specimen could represent a 10 nm by 10 nm area on the specimen while another pixel at a second location on the specimen (which may be relatively close to the first location) may represent a 11 nm by 11 nm area on the specimen, while the expected pixel size is 10.5 nm by 10.5 nm.

The portions of the design information and the images in the pairs may have any suitable size and may vary depending on the characteristics of the process(es) used to form the design information on the specimen and/or the process(es) used to generate the images. For example, in order for the images to contain useful information for training, a lower limit on the useful size of the images may be determined based on the optical scattering effects involved in generating the actual images (e.g., due to the point spread function (PSF) of a lithography tool and/or an optical imaging tool in the case of optical real images). In some examples, the size of the images may be on the order of an image frame (e.g., thousands of pixels) to the order of a patch image (e.g., tens of pixels).

The number of pairs of design information portions and images included in the training dataset may be any suitable number and may vary depending on the use case. For example, the number of images in the training dataset may number between a few hundred to a few thousand. To reduce the number of images in the training set, different methods for data augmentation may be possible, e.g., batch randomization, synthetic defects, etc. Synthetic defects are described further herein. With respect to batch randomization, training happens in batches of images (say 50 for example) and iteratively over a substantially large number of images (say 1000 for example). Randomization makes sure there is enough diversity in the 50 images selected per batch to make sure training convergence is smooth.

In one embodiment, at least one of the pairs in the set is generated for a defect detected on the specimen or another specimen. For example, as described further herein, the computer subsystem(s may be configured for detecting defects on the specimen and then generating sets of pairs in the training dataset based on the detected defects. The defects may be detected on the specimen in any suitable manner. If the defects that are detected and used to generate pairs in the training dataset are detected on a different specimen, that other specimen may be the same type (e.g., design rule, layer, etc.) as the specimen.

In another embodiment, the at least one of the pairs in the set is generated for a synthetic defect. In this manner, synthetic defects may be used to augment the data training set. In one such example, synthetic defects can be injected into the training dataset for SEM, optical, and other systems by modifying the CAD to inject defects (e.g., protrusions) and then rendering it using the network and adding it as a training example. The design information may be modified in any suitable manner to create synthetic defects in the design information. If actual images have not been generated for the modified design information portion, then a simulated image (which may be generated as described herein using a generative model) may be used as its image in the training dataset. Any one design information portion may be modified in a number of different ways to generate different synthetic defects therein. In addition, different portions of the design information may be modified in the same or different ways to create the same or different synthetic defects in each of the different portions of the design information. Furthermore, as noted above, the modified design information and image pairs may be combined with non-modified design information and image pairs to create the training dataset. The images included in the pairs in the training dataset are preferably actual (or non-simulated images) unless those actual images are not available. The other design information used in this embodiment may include any of the design information described herein.

In another embodiment, at least one of the pairs in the set is generated for a simulated defect. For example, a simulated defect may be used to augment the training dataset. A simulated defect may or may not be a synthetic defect. For example, not all synthetic defects may be used to generate a simulated image for the design information into which the synthetic defect is injected. Furthermore, a simulated defect may not be a synthetic defect injected into a design portion but a defect from another source that is simulated based on the possible source for that defect (e.g., defects caused not so much by defects in the design information but due to variations in processes used to form the design information on the specimen).

In a further embodiment, at least one of the pairs in the set is generated for a defect detected by process window qualification (PWQ). In this manner, detected defects from PWQ wafers may be used to augment the training dataset. PWQ may be performed as described in U.S. Pat. No. 6,902,855 to Peterson et al. issued on Jun. 7, 2005, U.S. Pat. No. 7,418,124 to Peterson et al. issued on Aug. 26, 2008, U.S. Pat. No. 7,769,225 to Kekare et al. issued on Aug. 3, 2010, U.S. Pat. No. 8,041,106 to Pak et al. issued on Oct. 18, 2011, and U.S. Pat. No. 8,213,704 to Peterson et al. issued on Jul. 3, 2012, which are incorporated by reference as if fully set forth herein. A defect detected by PWQ may be detected on the specimen or another specimen. The portion of the design information and the corresponding image may be generated in any suitable manner based on results of a PWQ inspection.

In some embodiments, the design information includes simulated images generated from design data. Generating the simulated images from design data may be performed using the machine learning systems described herein. In this manner, the embodiments described herein may use a machine learning system for CAD rendering for semiconductor related applications. In particular, in SID, input during training is an image of a specimen and ground truth of defective pixels, and output is a probability map of the defects. During runtime, input is an image, and output is the probability map of defects. For CAD rendering, during training, input is the CAD clip of a specimen and the ground truth (image of that specimen). The network learns how to represent the CAD clip as an image of the specimen. The overall concept is similar (train with data and ground truth). The simulations may also be performed as described in U.S. patent application Ser. No. 15/176,139 filed. Jun. 7, 2016 by Zhang et al., which is incorporated by reference as if fully set forth herein. The embodiments described herein may be further configured as described in this patent application.

In another embodiment, at least one of the images in the pairs includes an actual image generated of the specimen or another specimen by the imaging subsystem. For example, the pairs may be generated based on defects detected on the specimen or another specimen. In this manner, the images in the pairs may be images that are generated by the imaging subsystem at locations at which defects were detected. The portions of the design corresponding to those locations can be extracted from design information for the specimen in any suitable manner (e.g., based on wafer space positions of the defects and/or design data space positions of the defects). Examples of identifying locations of defects in design data space are described in the above-referenced patents to Zafar and Kulkarni. This embodiment may be further configured as described in these patent applications.

In an additional embodiment, at least one of the images in the pairs includes a synthetic image generated based on 1) the design information for the at least one image and 2) other images generated by the imaging subsystem for other specimens. For example, based on information for the design of the specimen and images generated for other specimens, information about the similarities and differences between the design information for the different specimens and how the other specimens were imaged by the imaging subsystem can be determined. Information about those similarities and differences can provide sufficient information for the generative model to generate a synthetic image of how the design information on the specimen would appear in the images generated by the imaging subsystem. For example, based on information about the similarities between the design information for different specimens and images for some of the specimens, images for others of the specimens can be generated/estimated by modifying the images for the specimens based on the similarities in the design.

In a further embodiment, at least one of the images in the pairs includes a simulated image generated based on 1) the design information for the at least one image and 2) one or more characteristics of the imaging subsystem. For example, based on information for the design for a portion of a. specimen and imaging characteristics of the imaging subsystem, the embodiments described herein can generate simulated images for how that portion of the specimen will appear in images generated by the imaging subsystem, which may be performed as described further herein. Those simulated images may then be included in the training data set with their corresponding design information portions.

In some optimization approaches, the generative model can learn to generate a defect at arbitrary locations (cross layer, cross location, etc.) making the data collection of defects of interest (DOIs) in the future unnecessary. For example, a network that can "render" or generate images (like SEM data for example) with defects just by using design clips may be used. It does not matter what location or layer the design clip belongs to. At that point, rendered defects can be used for training the detection/classification networks.

In one embodiment, the one or more computer subsystems are configured for detecting other defects in the images in the pairs in the set and associating labels with pixels in the images corresponding to results of detecting the other defects. In this manner, the computer subsystem(s) may generate a label map. For example, a label map may associate a label to each pixel of the image. As described further herein, the labels may indicate whether input features in the input feature map volume are associated with defects or not associated with defects. For example, the labels may be labels that indicate that no defect is present, i.e., "no defect" labels, or labels that indicate a defect is present, i.e., "defect detected" labels. In addition, as described further herein, the labels may indicate a type of defect with which features in the input feature map volume are associated. In one such example, the labels may include a class such as "Class A," "Class B", "Class 54," "Class 102," etc. The label map can be created by the computer subsystem(s) automatically by using a conventional die-to-die system performing equivalent task (trainer). However, the label map may be created by using any suitable defect detection (and optionally defect classification) methods and systems by associating results of the defect detection (and optionally defect classification) with different portions of the images and/or different features determined for different portions of the images based by the computer subsystem(s). For example, the images in the training dataset may be separated into blocks as described further herein, and one or more features may be determined for each (or at least some) of the blocks as described further herein. The features that are determined for the different portions of the images may include any of the types of features described herein. In this manner, the computer subsystem(s) may correlate the features determined for the blocks with the labels thereby creating an input feature map volume.

In one such embodiment, the one or more computer subsystems are configured for performing supervised training of the generative model by progressively modifying parameters of the generative model until features determined by the generative model for the images in the pairs are mapped to the labels associated with the pixels in the images. During the training (supervised training), the non-linear network progressively modifies its parameters (weights) to predict the correct label (as defined in the label map). For example, the one or more parameters of the generative model that are modified by the embodiments described herein may include one or more weights for any layer of the generative model that has trainable weights. In one such example, the weights may include weights for the convolution layers but not pooling layers. Different methods for training may be used to achieve relatively fast convergence and no overfitting. For example, fast training can be achieved via the use of multiple CPUs and pre-trained models.

Once the training is completed, the generative model and the updated parameters (model) are ready for deployment (e.g., to detect defects and/or classify defects on the specimen and other specimens). In this manner, the learned weights in the non-linear network represent the learned model, which can then be installed on a target system, e.g., one of the systems described herein. As such, during run time, the model is installed on the target system and new images are processed in forward mode (inference mode). The generative model produces a label map as described herein indicating accurately the content of the image, With the embodiments described herein, there is no need to prepare "hand-crafted features" ahead of time. Features are automatically learned from examples (internal data representation). The new embodiments are robust to natural variations learned from the data. Supporting a new layer or a new defect type is simple and fast by providing examples and re-training the system. For example, in some embodiments, the one or more computer subsystems are configured for modifying the training dataset by adding a new pair to the set, detecting one or more additional defects in an image in the new pair, associating one or more additional labels with pixels in the image corresponding to results of the detecting the one or more additional defects, and re-performing the supervised training by progressively modifying the parameters until the features determined for the images in the pairs and the new pair by the generative model are mapped to the labels associated with the pixels in the images in the pair and the new pair. In this manner, the training dataset may be updated with new pairs when a new defect is discovered, synthesized, or simulated, and the generative model may be re-trained using the updated training dataset. In addition to the time savings from eliminating the need for reference image acquisition, the time, effort, and cost of algorithm development is lower because of the self-learning nature of the deep learning approaches described herein (e.g., use of a generative model).

The embodiments described herein have a number of advantages over other methods for detecting defects on specimens. For example, the embodiments described herein are substantially robust compared to previously used methods and systems. In one such example, in the embodiments described herein, there is no need to design hand-crafted features ahead of time. Features are automatically learned to be optimal for the task at hand. In another such example, robustness to natural variations in the data is automatically learned by the embodiments described herein. In an additional example, the embodiments described herein have a relatively short cycle for recipe improvement. In a further such example, issues such as nominal process variations (e.g., LER) are automatically taken care of assuming such data is present in the training set.

The embodiments described herein are also advantageously generalizable. For example, the same neural net approach can be used for many different applications (e.g., SID, ADC, die to database, etc.). In addition, the embodiments described herein are advantageously scalable. For example, performance of the embodiments described herein improves with more data, and the embodiments are massively parallelizable. In particular, the number of problems that this approach can solve is larger than currently used methods and systems. In one such example, the same approach can scale to detecting and classifying all types of defects (process or pattern) on a specimen with the same methodology by merely adding the right training data.

A further advantage of the embodiments described herein is that they can leverage existing methods for bootstrapping. For example, existing defect detection algorithms such as those described further herein can be leveraged to bootstrap the training process. In addition, relatively slow simulation methods (e.g., Markov Chain) can be used for the simulations described herein (e.g., creating examples of defect types).

Each of the embodiments of each of the systems described above may be combined together into one single embodiment.

Another embodiment relates to a computer-implemented method for detecting defects on a specimen. The method includes separating a single test image generated for a portion of a specimen by an imaging subsystem into multiple blocks of pixels, which may be performed as described further herein. The imaging subsystem may be configured as described further herein. The method also includes, for at least one of the multiple blocks of pixels, determining a feature of the at least one of the multiple blocks based on only the pixels in the at least one of the multiple blocks. Determining the feature may be performed as described further herein. The separating and determining steps are performed by a generative model included in one or more components executed by one or more computer subsystems.

The generative model, the one or more components, and the one or more computer subsystems may be further configured as described herein. For example, the generative model includes a non-linear network configured for mapping blocks of pixels of an input feature map volume into labels, and the labels are indicative of one or more defect-related characteristics of the blocks.

In addition, the method includes selecting one of the labels for the at least one of the multiple blocks based on the determined feature and the mapping of the blocks of the pixels of the input feature map volume into the labels. Selecting the labels for the blocks may be performed according to any of the embodiments described herein. The method further includes detecting defects in the portion of the specimen based on the selected label for the at least one of the multiple blocks, which may be performed according to any of the embodiments described herein. The detecting is performed by the one or more computer subsystems.

Each of the steps of the method may be performed as described further herein. The method may also include any other step(s) that can be performed by the system, computer subsystem(s), and/or imaging systems or subsystems described herein. In addition, the method described above may be performed by any of the system embodiments described herein.

Figure 4:
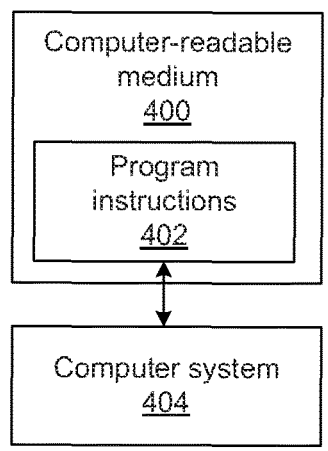
FIG. 4 is a block diagram illustrating one embodiment of a non-transitory computer-readable medium storing program instructions for causing a computer system to perform a computer-implemented method described herein.

An additional embodiment relates to a non-transitory computer-readable medium storing program instructions executable on a computer system for performing a computer-implemented method for detecting defects on a specimen. One such embodiment is shown in FIG. 4. In particular, as shown in FIG. 4, non-transitory computer-readable medium 400 includes program instructions 402 executable on computer system 404. The computer-implemented method may include any step(s) of any method(s) described herein.

Program instructions 402 implementing methods such as those described herein may be stored on computer-readable medium 400. The computer-readable medium may be a storage medium such as a magnetic or optical disk, a magnetic tape, or any other suitable non-transitory computer-readable medium known in the art.

The program instructions may be implemented in any of various ways, including procedure-based techniques, component-based techniques, and/or object-oriented techniques, among others. For example, the program instructions may be implemented using ActiveX controls, C++ objects, Javabeans, Microsoft Foundation Classes ("MFC"), SSE (Streaming SIMD Extension) or other technologies or methodologies, as desired.

Computer system 404 may be configured according to any of the embodiments described herein.

Further modifications and alternative embodiments of various aspects of the invention will be apparent to those skilled in the art in view of this description. For example, methods and systems for detecting defects on a specimen are provided. Accordingly, this description is to be construed as illustrative only and is for the purpose of teaching those skilled in the art the general manner of carrying out the invention. It is to be understood that the forms of the invention shown and described herein are to be taken as the presently preferred embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

What is claimed is:

1. A system configured to detect defects on a specimen, comprising:
an imaging subsystem configured for generating images of a specimen, wherein the imaging subsystem comprises at least an energy source configured to direct energy to the specimen and at least a detector configured to detect energy from the specimen;
one or more computer subsystems coupled to the imaging subsystem, wherein the one or more computer subsystems are configured for acquiring a single test image for a portion of the specimen generated by the imaging subsystem; and
one or more components executed by the one or more computer subsystems, wherein the one or more components comprise:
a generative model, wherein the generative model comprises a non-linear network configured for mapping blocks of pixels of an input feature map volume into labels, and wherein the labels are indicative of one or more defect-related characteristics of the blocks;
wherein the one or more computer subsystems are further configured for inputting the single test image into the generative model;
wherein the generative model is configured for:
separating the single test image into multiple blocks of pixels;
for at least one of the multiple blocks of pixels, determining a feature of the at least one of the multiple blocks based on only the pixels in the at least one of the multiple blocks; and
selecting one of the labels for the at least one of the multiple blocks based on the determined feature and the mapping of the blocks of the pixels of the input feature map volume into the labels; and
wherein the one or more computer subsystems are further configured for detecting defects in the portion of the specimen based on the selected label for the at least one of the multiple blocks.

2. The system of claim 1, wherein the generative model is a deep generative model.

3. The system of claim 1, wherein the generative model is a machine learning model.

4. The system of claim 1, wherein the generative model is a convolution neural network.

5. The system of claim 1, wherein detecting the defects does not comprise aligning the single test image to any other image.

6. The system of claim 1, wherein detecting the defects does not comprise comparing the single test image to any other image.

7. The system of claim 1, wherein detecting the defects does not comprise statistical based defect detection.

8. The system of claim 1, wherein the labels indicate whether input features in the input feature map volume are associated with defects or are not associated with defects.

9. The system of claim 1, wherein the labels indicate a type of defect to which input features in the input feature map volume are associated.

10. The system of claim 1, wherein the one or more computer subsystems are further configured for determining a type of the defects in the portion of the specimen based on the selected label for the at least one of the multiple blocks.

11. The system of claim 1, wherein selecting one of the labels for the at least one of the multiple blocks comprises selecting only one of the labels for a combination of the multiple blocks.

12. The system of claim 1, wherein the one or more computer subsystems are further configured for generating a training dataset used for training the generative model, and wherein the training dataset comprises a set of pairs of a portion of design information for the specimen and an image generated for the portion of the design information.

13. The system of claim 12, wherein at least one of the pairs in the set is generated for a defect detected on the specimen or another specimen.

14. The system of claim 12, wherein at least one of the pairs in the set is generated for a synthetic defect.

15. The system of claim 12, wherein at least one of the pairs in the set is generated for a simulated defect.

16. The system of claim 12, wherein at least one of the pairs in the set is generated for a defect detected by process window qualification.

17. The system of claim 12, wherein the design information comprises design data.

18. The system of claim 12, wherein the design information comprises simulated images generated from design data.

19. The system of claim 12, wherein at least one of the images in the pairs comprises an actual image generated of the specimen or another specimen by the imaging subsystem.

20. The system of claim 12, wherein at least one of the images in the pairs comprises a synthetic image generated based on 1) the design information for the at least one image and 2) other images generated by the imaging subsystem for other specimens.

21. The system of claim 12, wherein at least one of the images in the pairs comprises a simulated image generated based on 1) the design information for the at least one image and 2) one or more characteristics of the imaging subsystem.

22. The system of claim 12, wherein the one or more computer subsystems are further configured for detecting other defects in the images in the pairs in the set and associating labels with pixels in the images corresponding to results of said detecting the other defects.

23. The system of claim 22, wherein the one or more computer subsystems are further configured for performing supervised training of the generative model by progressively modifying parameters of the generative model until features determined by the generative model for the images in the pairs are mapped to the labels associated with the pixels in the images.

24. The system of claim 23, wherein the one or more computer subsystems are further configured for modifying the training dataset by adding a new pair to the set, detecting one or more additional defects in an image in the new pair, associating one or more additional labels with pixels in the image corresponding to results of said detecting the one or more additional defects, and re-performing the supervised training by progressively modifying the parameters until the features determined for the images in the pairs and the new pair by the generative model are mapped to the labels associated with the pixels in the images in the pair and the new pair.

25. The system of claim 1, wherein the one or more computer subsystems are further configured for generating multiple perspectives of the single test image, and wherein the single test image input by the one or more computer subsystems into the generative model comprises the multiple perspectives of the single test image.

26. The system of claim 1, wherein the one or more computer subsystems are further configured for detecting the defects based on the selected label in combination with design information for the specimen.

27. The system of claim 1, wherein the one or more computer subsystems are further configured for detecting the defects based on the selected label and without design information for the specimen.

28. The system of claim I, wherein the imaging subsystem is an electron beam based imaging subsystem.

29. The system of claim 1, wherein the imaging subsystem is an optical based imaging subsystem.

30. The system of claim 1, wherein the imaging subsystem is an inspection subsystem.

31. The system of claim 1, wherein the imaging subsystem is a defect review subsystem.

32. The system of claim 1, wherein the imaging subsystem is a metrology subsystem.

33. The system of claim 1, wherein the specimen is a wafer.

34. The system of claim 1, wherein the specimen is a reticle.

35. A non-transitory computer-readable medium, storing program instructions executable on a computer system for performing a computer-implemented method for detecting defects on a specimen, wherein the computer-implemented method comprises:
    separating a single test image generated for a portion of a specimen by an imaging subsystem into multiple blocks of pixels;
    for at least one of the multiple blocks of pixels, determining a feature of the at least one of the multiple blocks based on only the pixels in the at least one of the multiple blocks, wherein said separating and said determining are performed by a generative model included in one or more components executed by one or more computer subsystems, wherein the generative model comprises a non-linear network configured for mapping blocks of pixels of an input feature map volume into labels, and wherein the labels are indicative of one or more defect-related characteristics of the blocks;
    selecting one of the labels for the at least one of the multiple blocks based on the determined feature and the mapping of the blocks of the pixels of the input feature map volume into the labels; and
    detecting defects in the portion of the specimen based on the selected label for the at least one of the multiple blocks, wherein said detecting is performed by the one or more computer subsystems.

36. A computer-implemented method for detecting defects on a specimen, comprising:
    separating a single test image generated for a portion of a specimen by an imaging subsystem into multiple blocks of pixels;
    for at least one of the multiple blocks of pixels, determining a feature of the at least one of the multiple blocks based on only the pixels in the at least one of the multiple blocks, wherein said separating and said determining are performed by a generative model included in one or more components executed by one or more computer subsystems, wherein the generative model comprises a non-linear network configured for mapping blocks of pixels of an input feature map volume into labels, and wherein the labels are indicative of one or more defect-related characteristics of the blocks;
    selecting one of the labels for the at least one of the multiple blocks based on the determined feature and the mapping of the blocks of the pixels of the input feature map volume into the labels; and
    detecting defects in the portion of the specimen based on the selected label for the at least one of the multiple blocks, wherein said detecting is performed by the one or more computer subsystems.

* * * * *